Sept. 25, 1934. S. W. HARRIS ET AL 1,974,919
MACHINE FOR ENGRAVING MOLDS
Filed Dec. 3, 1930 14 Sheets-Sheet 7

INVENTORS
STANLEY W. HARRIS.
FRANK H. JENNINGS.
RETUS W. SETHMAN.
BY
ATTORNEYS.

Sept. 25, 1934.   S. W. HARRIS ET AL   1,974,919
MACHINE FOR ENGRAVING MOLDS
Filed Dec. 3, 1930   14 Sheets-Sheet 8
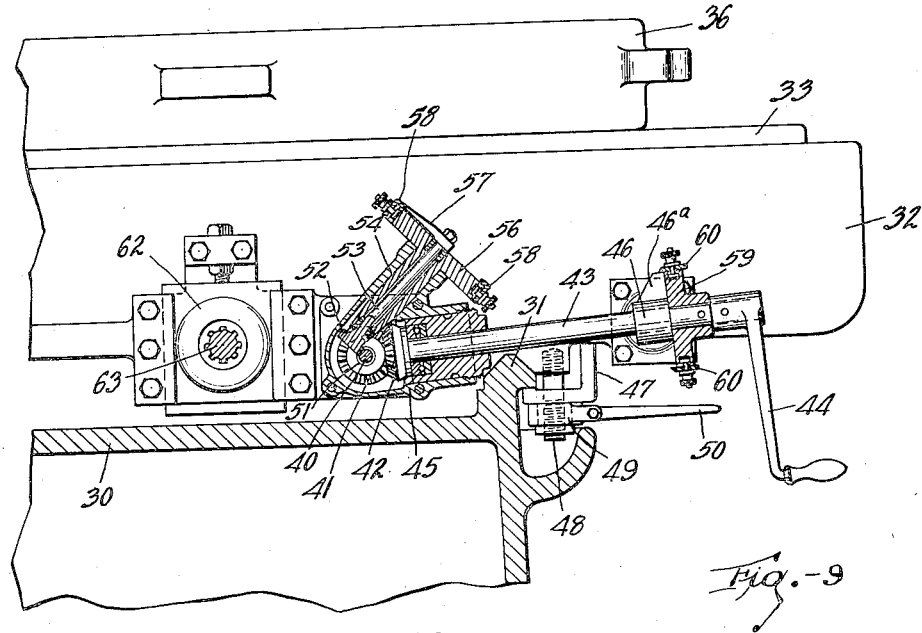
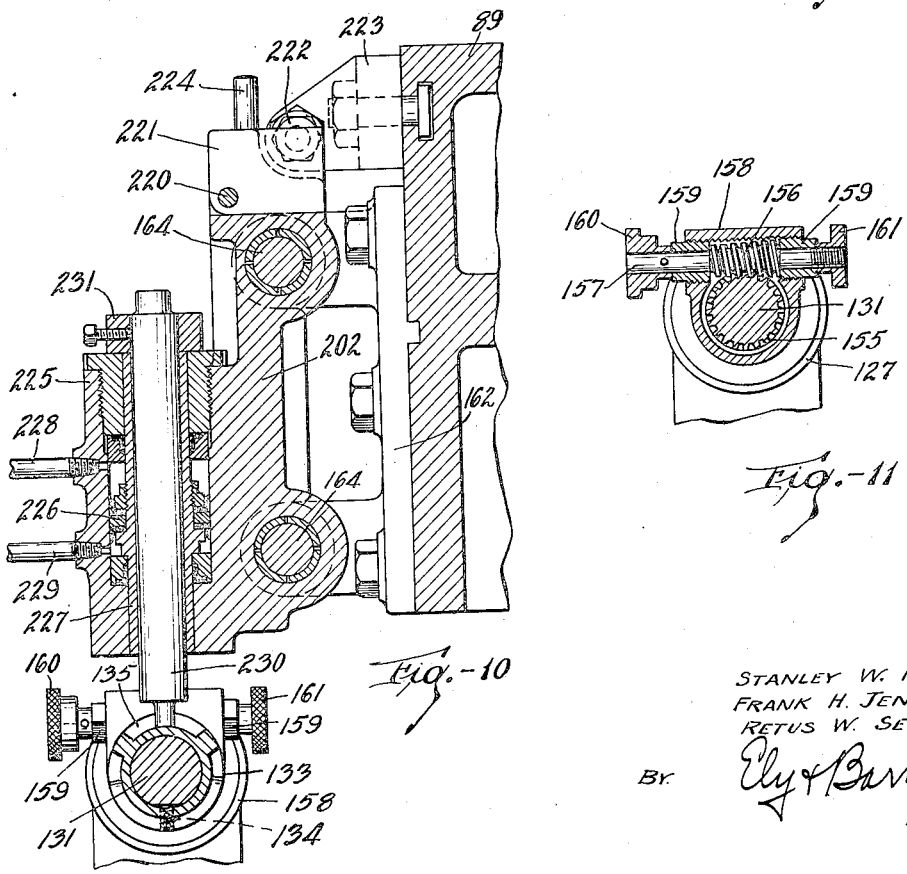
INVENTORS
STANLEY W. HARRIS
FRANK H. JENNINGS
RETUS W. SETHMAN
BY Ely & Barrow
ATTORNEYS Sept. 25, 1934.  S. W. HARRIS ET AL  1,974,919
MACHINE FOR ENGRAVING MOLDS
Filed Dec. 3, 1930  14 Sheets-Sheet 9

INVENTORS
STANLEY W. HARRIS
FRANK H. JENNINGS
RETUS W. SETHMAN

By Ely & Barrow
ATTORNEYS

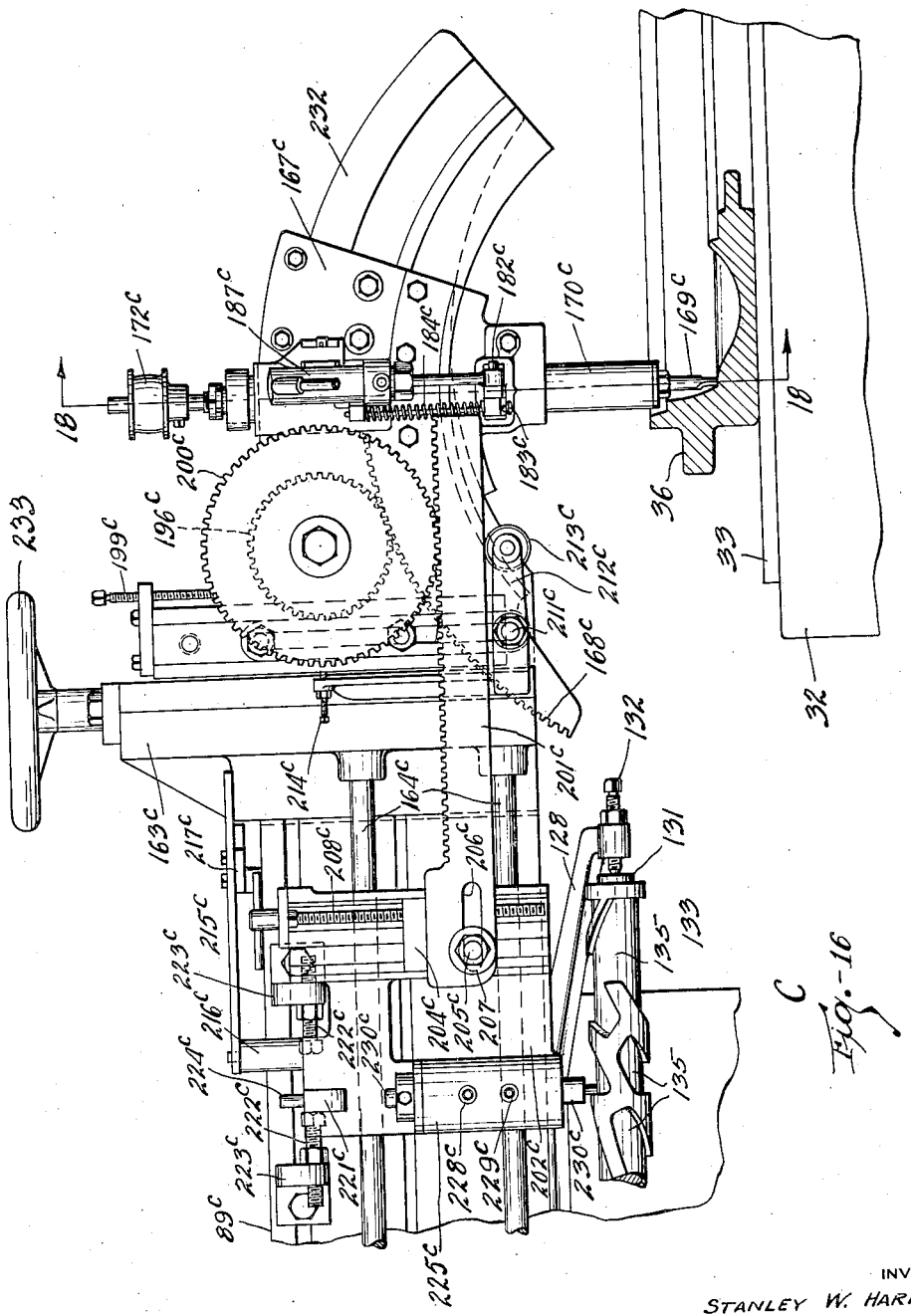

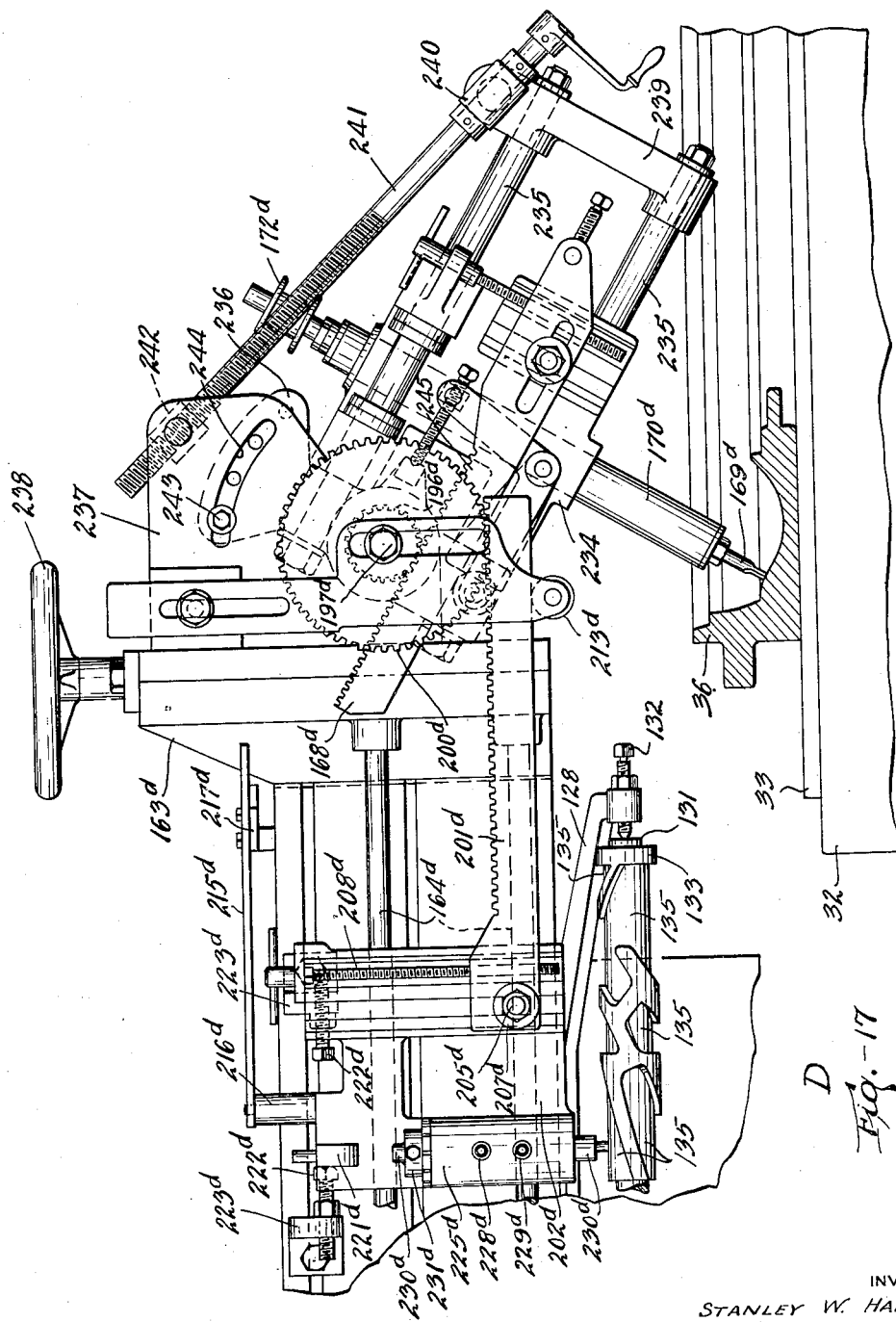
Sept. 25, 1934.  S. W. HARRIS ET AL  1,974,919
MACHINE FOR ENGRAVING MOLDS
Filed Dec. 3, 1930  14 Sheets-Sheet 12
INVENTORS
STANLEY W. HARRIS
FRANK H. JENNINGS
RETUS W. SETHMAN
ATTORNEYS

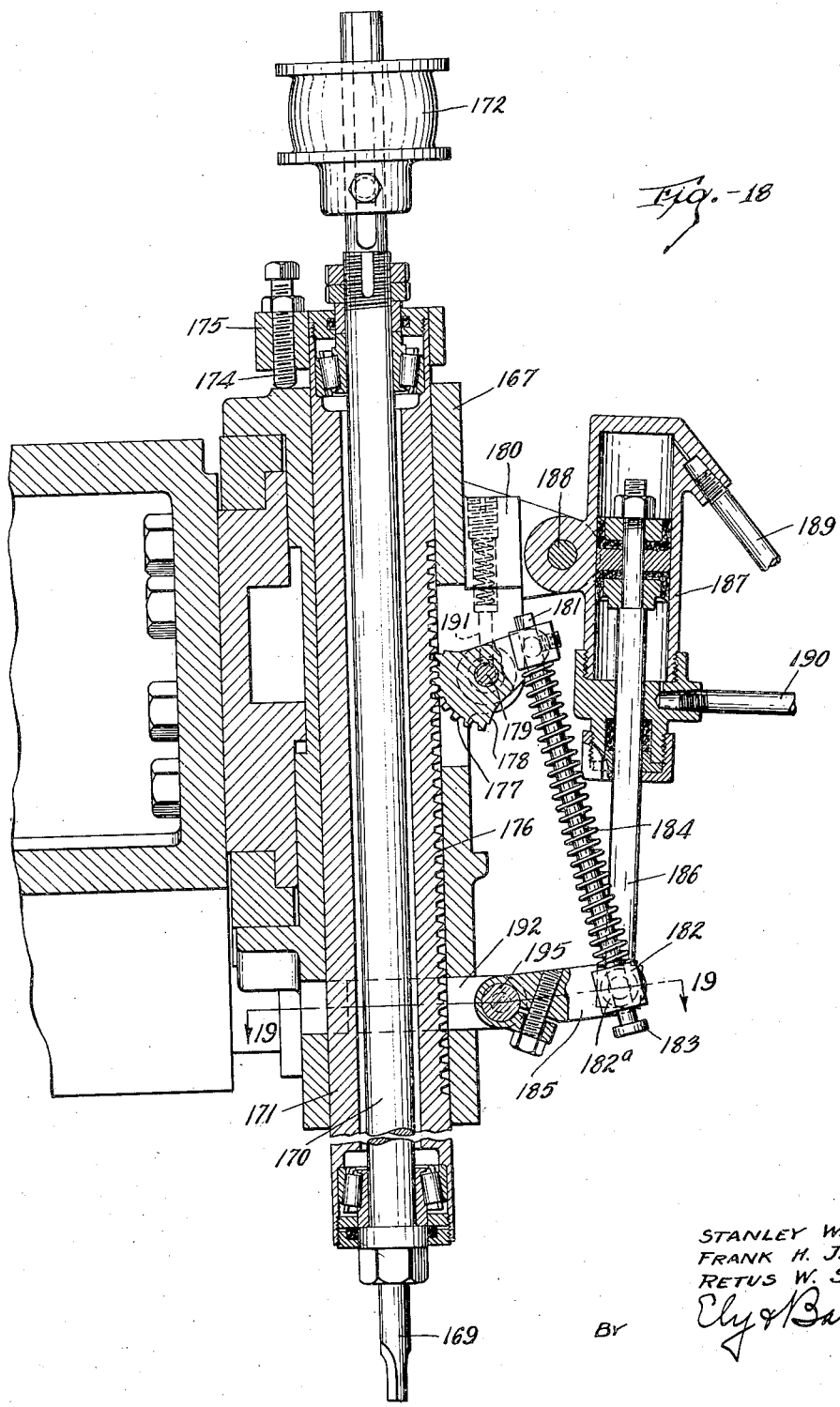

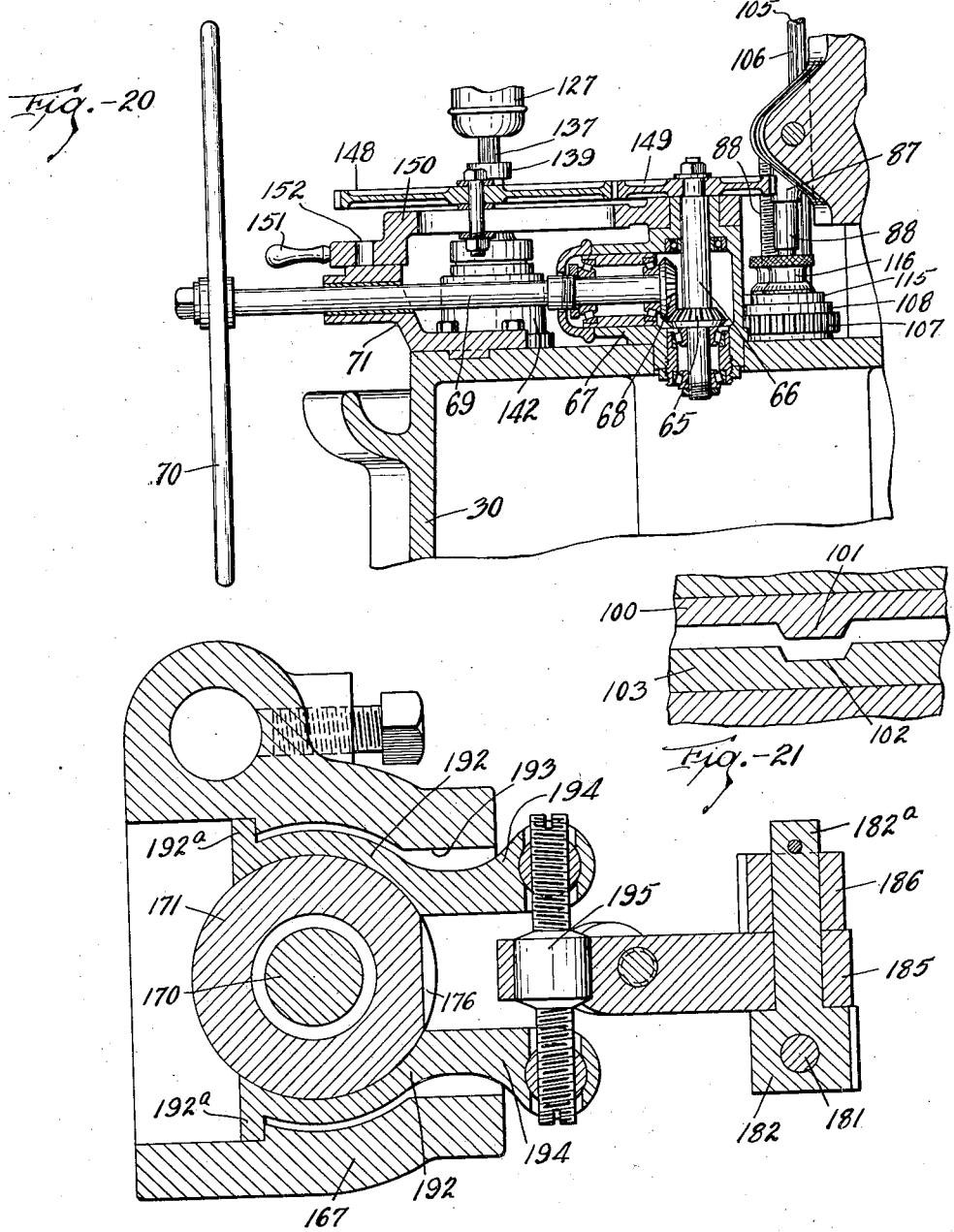

Patented Sept. 25, 1934

1,974,919

UNITED STATES PATENT OFFICE 1,974,919

MACHINE FOR ENGRAVING MOLDS

Stanley W. Harris and Frank H. Jennings, Akron, and Retus W. Sethman, Cuyahoga Falls, Ohio, assignors to The National Rubber Machinery Company, Akron, Ohio, a corporation of Ohio Application December 3, 1930, Serial No. 499,716

23 Claims. (Cl. 90—13.7)

This invention relates to machines for engraving molds, and more especially it relates to apparatus for engraving the cavities of molds in which pneumatic tire casings are formed and vulcanized.

More specifically, the machine is designed to engrave that portion of a tire mold which shapes the tread portion of a tire, which tread portion usually is of such contour in transverse section, as to require three or four separate engraving operations. In the prior practice, the respective engraving operations were performed on different engraving machines, necessitating transfer of the work from one machine to another, and frequently resulting in defective work due to mismatching or non-uniformity of the characters of the engraved design.

The chief objects of this invention are to obviate the necessity of transferring a tire mold from one engraving machine to another while engraving the tread-forming portion of the mold cavity; to provide simple and easily operated means for aligning a tire mold with an engraving pattern or cam; to provide power means for yieldingly feeding an engraving tool into the work; to obviate the necessity of moving the mold to feed the engraving tool thereinto; and to provide apparatus for accomplishing the foregoing objects. The saving of time and labor, and accuracy and uniformity of the product are more specific objects contemplated.

Of the accompanying drawings:

Figure 9 is a section on line 9—9 of Figure 5;

Figure 10 is a section on lines 10—10 of Figures 2, 6, and 14;

Figure 11 is a section on lines 11—11 of Figures 5 and 6;

Figure 16 is a view similar to Figure 14 of the engraving unit designated "C" in Figure 1;

Figure 17 is a view similar to Figure 14 of the engraving unit designated "D" in Figure 1;

Figure 18 is a section on line 18—18 of Figure 16;

Figure 19 is a section on line 19—19 of Figure 18, on a larger scale;

Figure 20 is a section on line 20—20 of Figure 5; and

Figure 21 is a section on line 21—21 of Figure 3.

General features

Figure 1:
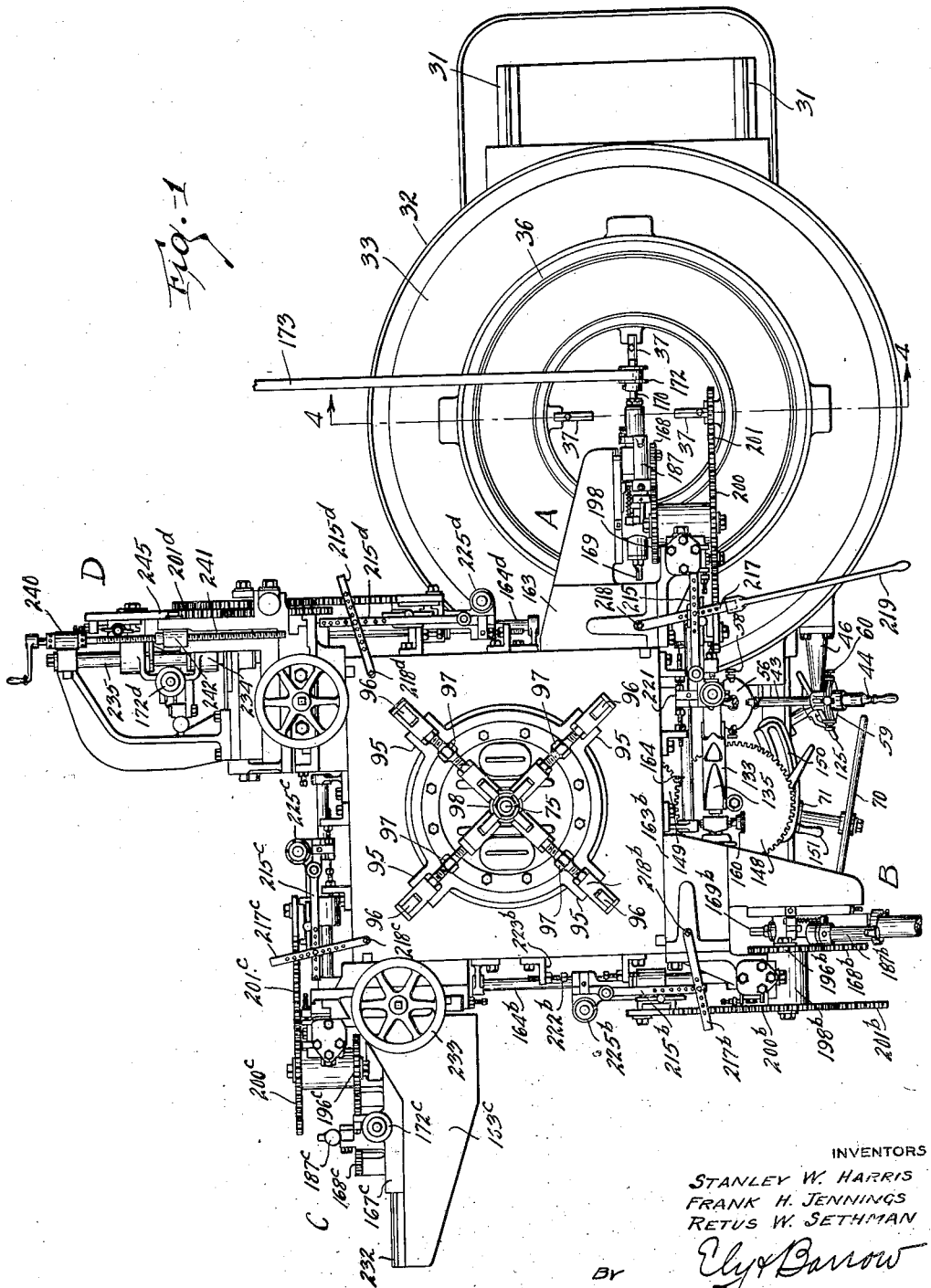
Figure 1 is a plan view of a machine embodying the invention in its preferred form, and the work therein.

Referring to Figure 1 of the drawings, the work consists of one-half of a two-part mold for rubber tires, and it is mounted upon a rotatable table which is adjustable longitudinally of the machine to bring the work to a determinate position so that its tread-molding portion may be engaged by an engraving tool. The transverse contour of a tire tread includes at least three and usually four different radii, and some surfaces of the tread are convex and some concave, with the result that three or four different engraving units are required for completely engraving the tread portion of a mold.

In Figure 1 of the drawings, four engraving units, designated A, B, C, and D respectively are shown. The said engraving units are mounted upon a turret which may be raised and lowered, and which may be rotated to bring the engraving units selectively into operative relation to the work. Automatically operating means is provided for positioning the turret at different elevations according to which engraving unit is in engraving position over the work. The engraving tools are belt-driven and one belt is provided for all of them, the belt being arranged to drive the tool in the operating position, and to be removed therefrom and connected to the tool performing the succeeding operation when the latter is brought into operative position. Each engraving unit includes two two-way fluid-pressure operated cylinders, and all of said cylinders are connected by flexible conduits to common fluid pressure manifolds located on the top of the turret, the manifolds being omitted from the drawings for clearness of illustration.

The machine includes a single pattern or cam controlling the movement of the engraving tools in the several engraving operations, and each engraving unit is provided with a cam follower adapted to be brought into operative relation to said pattern or cam. The cam is interconnected with the mold-rotating means and makes a determinate number of revolutions for one revolution of the mold, and means is provided for quickly changing the ratio of rotation of the cam to the mold to vary the number of characters engraved circumferentially of the mold. Means also is provided for turning the pattern angularly with relation to its axial support, upon occasion, when it is necessary to align the pattern with characters already cut in the mold, or to align the mold itself with the pattern. The mechanism for adjusting the work-table longitudinally of the machine is provided with gauge means by which successive molds mounted on the table may be quickly and accurately positioned with relation to the respective engraving units as the latter are brought to operative position. The engraving tools are mechanically fed into the work, and means is provided whereby they are yieldingly urged toward the work to lessen the impact with the latter, and then are positively held against recession.

Work table

Figure 4:
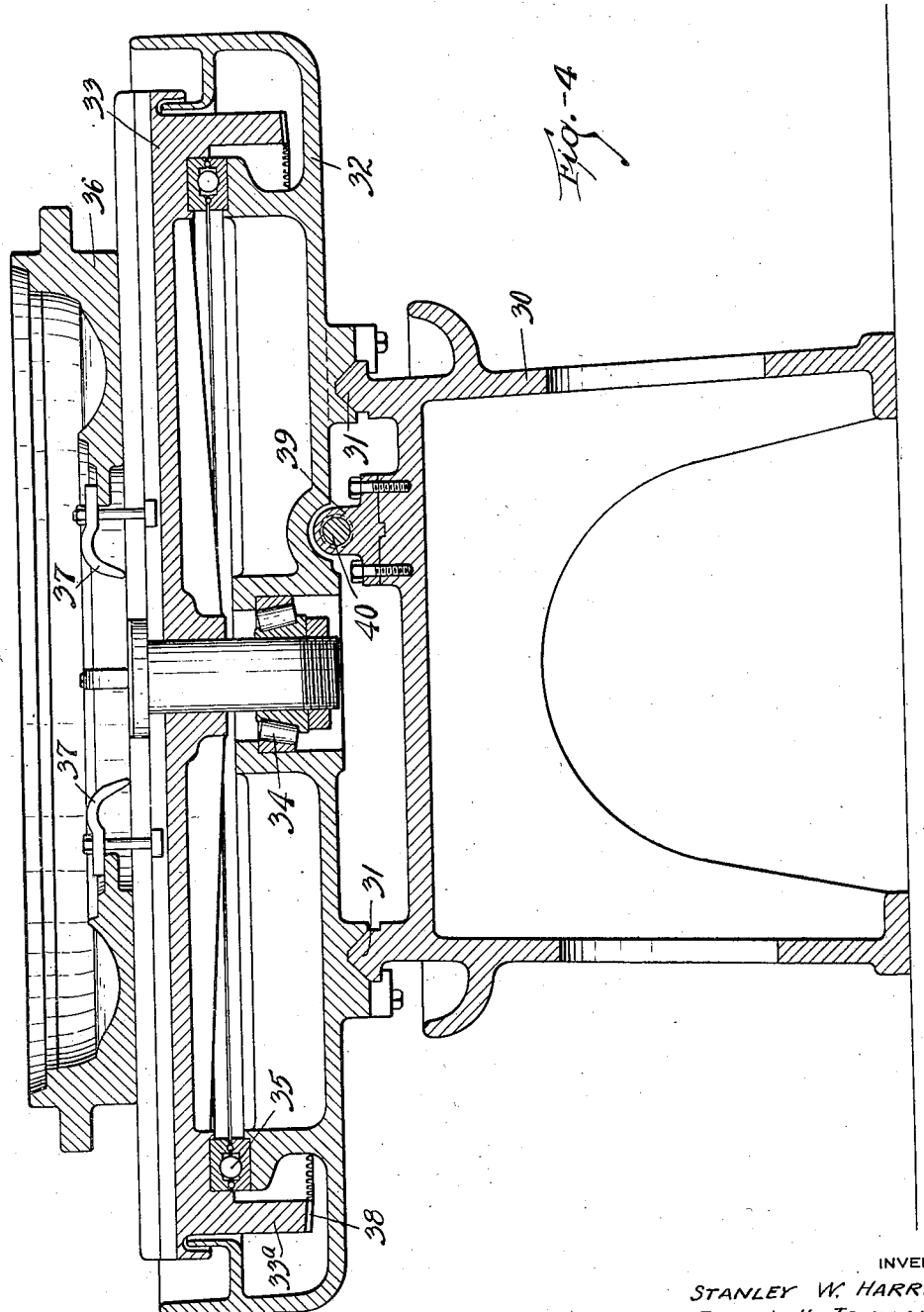
Figure 4 is a vertical section of the work-table and the work thereon, taken on line 4—4 of Figure 1.
Figure 5:
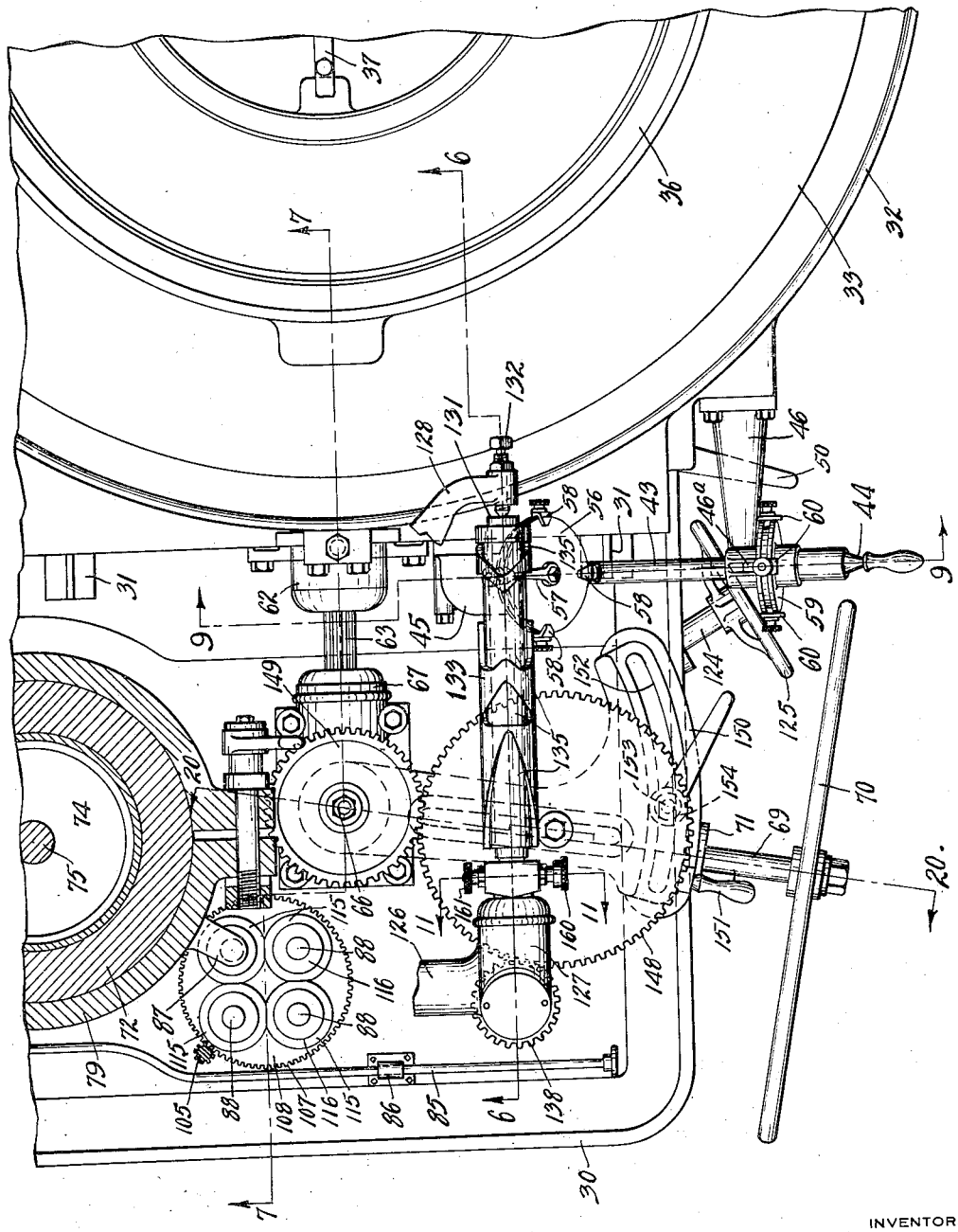
Figure 5 is a section on line 5—5 of Figure 2.

Referring to the drawings, the machine comprises a base casting 30 formed with parallel rails 31, 31 extending along its top at the front and rear thereof, and at the right end of the casting as shown in the drawings. Mounted for sliding movement upon the rails 31 is a carriage or saddle 32 (see Figure 4) which carries a turntable 33, the usual axial bearing 34 and peripheral bearings 35 being provided to facilitate rotation of the table on the saddle. The table 33 is adapted to support a half of a tire mold 36 which is secured to the table by the usual clamps 37. The table 33 is formed with a depending flange or apron 33ª near its outer periphery, and the edge face of said apron is formed with gear teeth 38 by which the table is rotated upon its axis as presently will be described.

Figure 6:
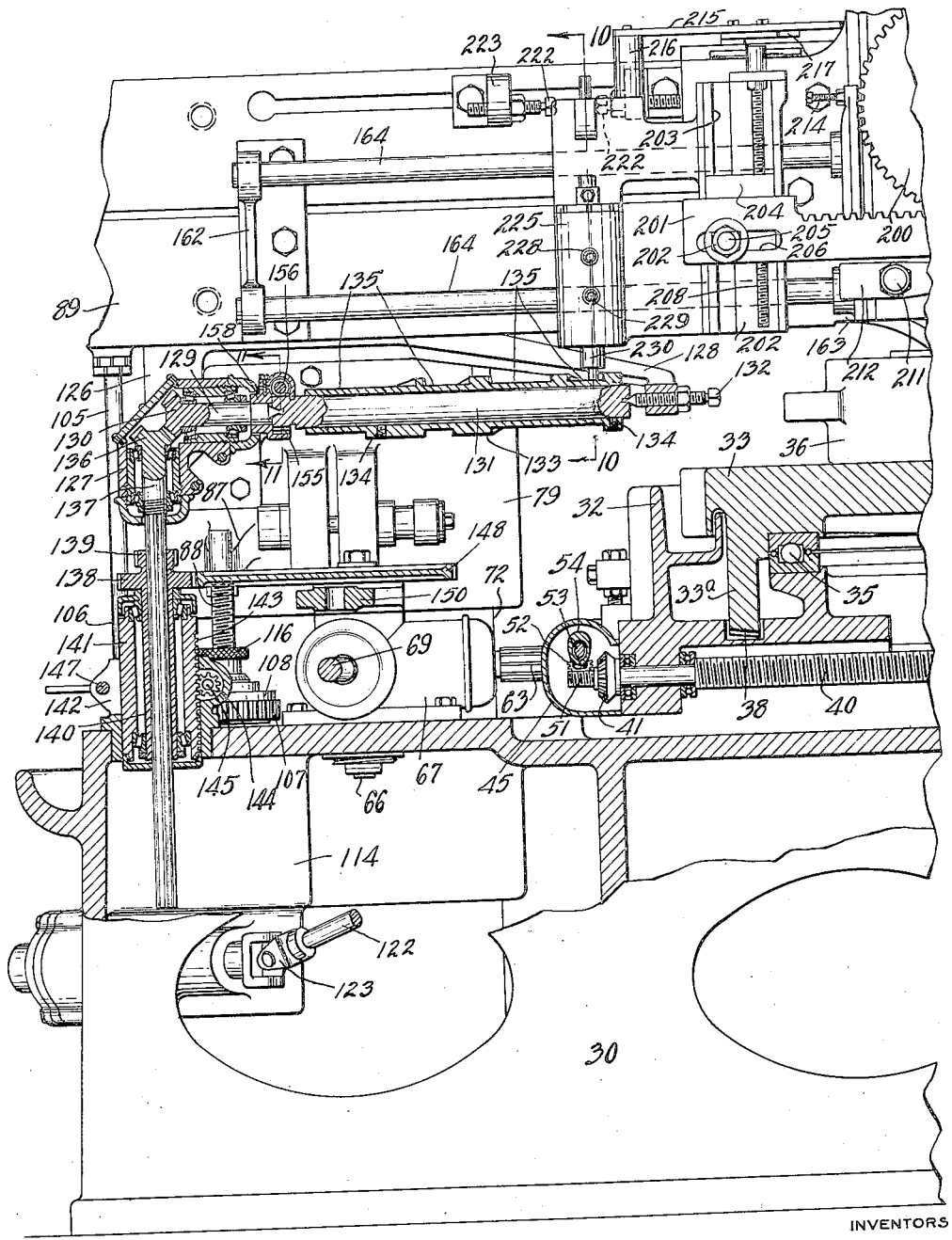
Figure 6 is a section on line 6—6 of Figure 5.

For moving the saddle 32 longitudinally upon the rails 31, a nut 39 is mounted in fixed position upon the top of the base casting 30 beneath the saddle, and threaded through the nut 39 is one end of a threaded shaft or screw 40 which is journaled at its other end in the wall of the saddle (see Figure 6) and provided exteriorly thereof with a bevel gear 41. The latter is meshed with a bevel gear 42 on one end of a shaft 43 that extends at right angles from the shaft 41 toward the front of the machine and has its other end provided with a hand crank 44. The shaft 43 is suitably journaled in a housing 45 that encloses the bevel gears 41, 42, and in a bracket 46 extending from the saddle 32. Thus by turning the crank 44 the saddle 32 may be moved to left or right as desired. An L-shaped clamp 47 (Figure 9) mounted upon a threaded stud 48 projecting from the under side of the saddle 32 engages the under side of a rail 31 and is drawn up thereagainst by a nut 49 on the stud 48, said nut being provided with a handle 50 for easy manipulation. The arrangement provides means for easily and quickly locking the saddle in adjusted position.

For denoting the proper positions of the saddle for the respective mold-engraving operations, and to assist in the quick and accurate positioning of the saddle, a visible indicating device is associated with the shafts 40, 43. The outer end of the shaft 40 is formed with a thread or worm 51 (Figure 6) and meshed with said worm is a worm gear 52 (Figures 6 and 9) on one end of a stem 53 which is journaled in a quill 54 mounted in the housing 45, the outer end of the quill 54 being formed with a dial 56, and the outer end of the stem 53 being provided with an indicator or finger 57 adapted to move over the face of the dial. A plurality of riders 58, 58, herein shown as four in number are slidably mounted upon the periphery of the dial 56, and are independently positionable thereabout. The gear ratio of the worm and worm gear 51, 52 is 40 to 1 so that forty revolutions of the shafts 40, 43 are required for the indicator 57 to make one revolution about the dial 56. Mounted upon the shaft 43 abutting the bracket 46 is a flanged collar or dial 59 having a plurality of riders 60, 60 (herein shown as four in number) adjustably mounted upon the periphery of its flange. The bracket 46 is formed with an upstanding portion 46ª abutting the dial 59 and constituting a marker with which the riders 60 are adapted to be registered. The arrangement provides a micrometer adjustment for accurately positioning the saddle 32. The various riders are numbered to correspond to the several positions of a mold during the engraving operations and the riders are properly positioned on their dials when the first mold is mounted upon the table and engraved. Thereafter, succeeding molds are accurately positioned with relation to the engraving units by turning the crank 44 to cause the indicator 57 to point to the proper rider 58, and the corresponding rider 60 to register with the marker 46ª.

For rotating the table 33 upon the saddle 32, a gear 61 is meshed with the gear 38 formed on the apron 33ª of the table, said gear 61 being formed with an elongated hub portion 61ª which is journaled in suitable bearings mounted in a housing 62, the latter preferably being adjustably mounted upon the saddle 32 as shown to provide accuracy of alignment. Extending through the gear 61 is a splined shaft 63 of sufficient length to engage the gear at all times notwithstanding the various positions of the saddle 32. The outer end of the shaft 63 is provided with a bevel gear 64 which is meshed with a bevel gear 65 mounted upon a vertical shaft 66 which is suitably journaled in a housing 67 mounted upon the base casting 30, the outer end of the shaft 63 being journaled in the same housing. Also meshed with the gear 65 is a bevel gear 68 mounted on the inner end of a horizontal shaft 69 which extends to the front of the machine and is provided thereat with a handwheel 70 by which it is manually rotated to turn the table 33 angularly upon the saddle 32. The shaft 69 is journaled in the housing 67, and in a bracket 71 mounted upon the base casting 30 at the front of the machine.

The turret

Mounted in the base-casting 30, at the left thereof as viewed in Figures 1, 2, 3 and 5, is a vertical fluid pressure cylinder 72 which extends to considerable height above the base casting and has its respective cylinder heads 73, 73 (see Figure 3) positioned interiorly of its outer shell relatively remote from the ends thereof. The cylinder is provided with the usual piston 74, and with a piston rod 75 that extends through the upper cylinder head. The fluid pressure cylinder is double acting and preferably is pneumatically operated, air being conducted thereto by a pipe 76 which communicates with the chamber of the cylinder through the lower cylinder head, and by a pipe 77 which enters the cylinder wall 72 at an elevation just above the base casting 30 and communicates with the upper end of the cylinder chamber through a duct 78 in said cylinder wall.

Slidably mounted for vertical movement upon the exterior of the cylinder 72 is a head 79 having its upper end closed by a cap 80 through which the piston rod 75 extends, there being nuts 81, 81 threaded onto the piston rod 75 on opposite sides of the cap 80, and so spaced apart thereon as to provide a determinate amount of lost motion between the piston rod and the cap. The head 79 may be supported in elevated position by means of rack 82 secured thereto and engaged by a dog 83 which is pivoted to the base casting 30 at 84, there being an operating rod 85 connected to the dog and extending to the front of the machine through a bracket 86 to permit the operator to disengage the dog from the rack. Formed on the lower part of the head 79 is an outstanding abutment 87 which, in the lowermost position of the head, engages one of a plurality of stop pins 88, 88 of different heights to support the head at the proper elevation for the corresponding engraving head to engage the work. Mechanism for automatically positioning the respective stop pins 88 beneath the abutment 87 in synchronism with the operative positioning of the engraving units presently will be described.

The head 79 is formed near its middle with a radial flange 79ª upon which is mounted a square turret 89 upon the respective lateral faces of which are mounted the engraving units A, B, C, and D. The cap 80 is formed with a depending marginal flange 80ª on the outside of the head 79, and the turret is arranged for limited axial movement on the head 79, between the flange 79ª and the cap flange 80ª, as well as rotative movement about the axis of the head.

The turret is normally urged upwardly with relation to the flange 79ª by a plurality of strong compression springs 90, 90 (Figure 3) which are seated in suitable recesses arranged about the inner periphery of said flange and bear upwardly against the lower raceway of a ball bearing 91 extending circumferentially of the head 79, the upper raceway of the ball bearing consisting of a ring gear 92 secured to the under side of the turret. A second circumferential ball bearing 93 is positioned between the top of the turret and the cap 80, a plurality of weak compression springs 94 being mounted in the cap for urging the bearing against the turret.

For lowering the turret onto the flange 79ª against the pressure of the springs 90, the cap 80 is formed with a plurality of radial brackets 95, 95 in which are journaled respective angular lever arms 96, 96, the upper ends of said arms being connected by respective adjustable links 97, 97 to a common bracket 98 mounted upon the outer end of the piston rod 75. The free ends of the lever arms 96 are provided with rollers 99, 99 which engage the top of the turret 89, the arrangement being such that when the piston rod 75 moves downward it swings the lever arms 96 to the positions shown in Figure 2 whereby the turret is forced downwardly against the upward pressure of the springs 90. The operation is reversed when the piston rod moves upwardly, thus permitting the parts to assume the positions shown in Figure 3, and such relative movement of the head 79 and turret 89 is effected before any bodily movement of the head 79 begins by reason of the lost motion connection between the piston rod 75 and the cap 80.

Figure 3:
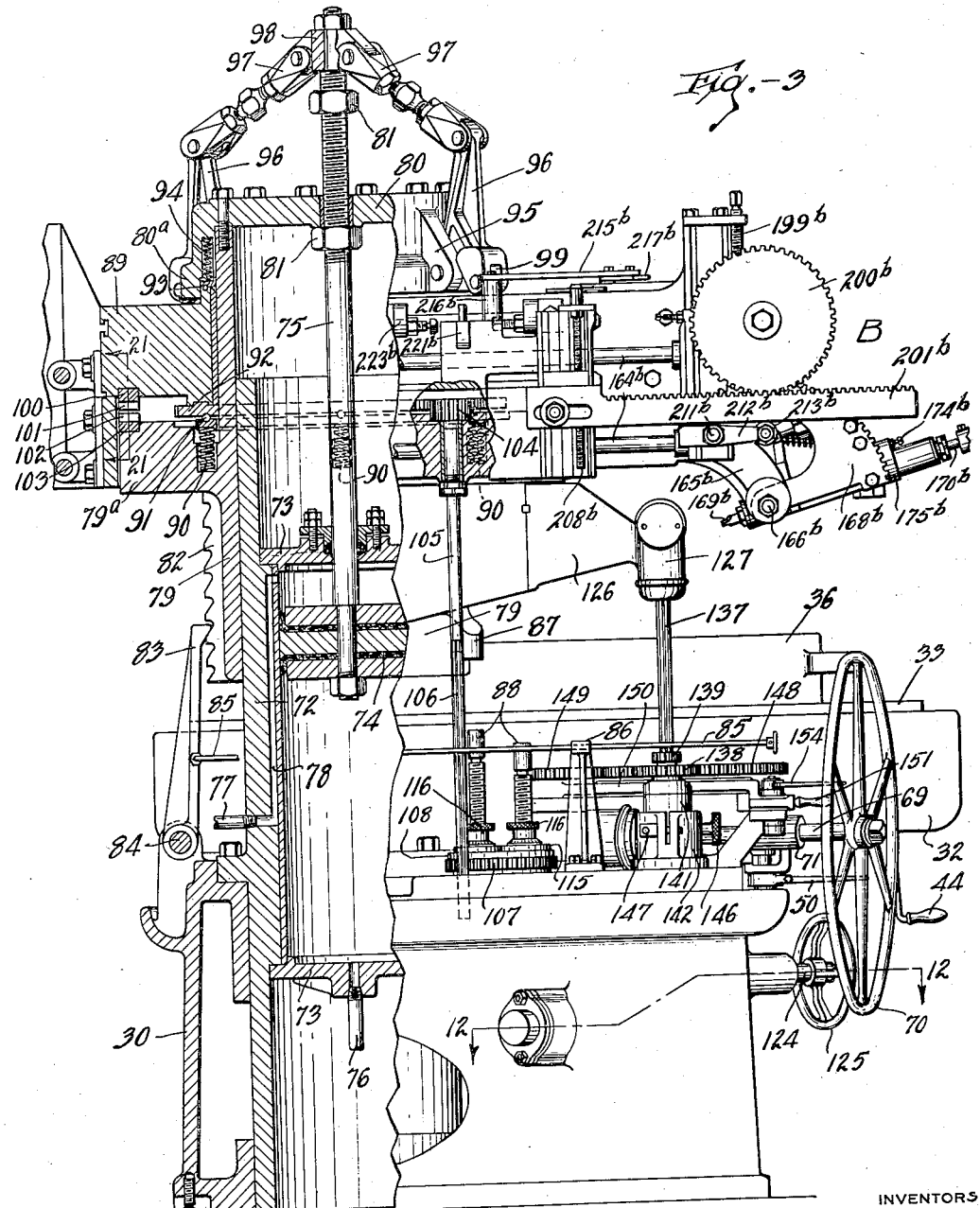
Figure 3 is an end elevation of the machine as viewed from the left of Figure 2, parts being broken away and in section.

When the machine is in the position shown in Figure 3, the turret 89 may be manually turned angularly upon the head 79 to bring the engraving heads A, B, C, or D carried thereby selectively into operative position over the work 36. For accurately positioning the turret in any of its operative positions, the bottom face of the turret carries a circumferential ring 100 formed at equally spaced intervals with downwardly projecting tapered lugs, such as the lug 101, (Figure 21) and said lugs are adapted to seat in respective complementally shaped recesses, such as the recess 102 formed in the upper face of a circumferential ring 103 carried on the upper face of the flange 79ª, the lugs moving into the recesses when the turret is forced downwardly toward the flange 79ª.

Figure 7:
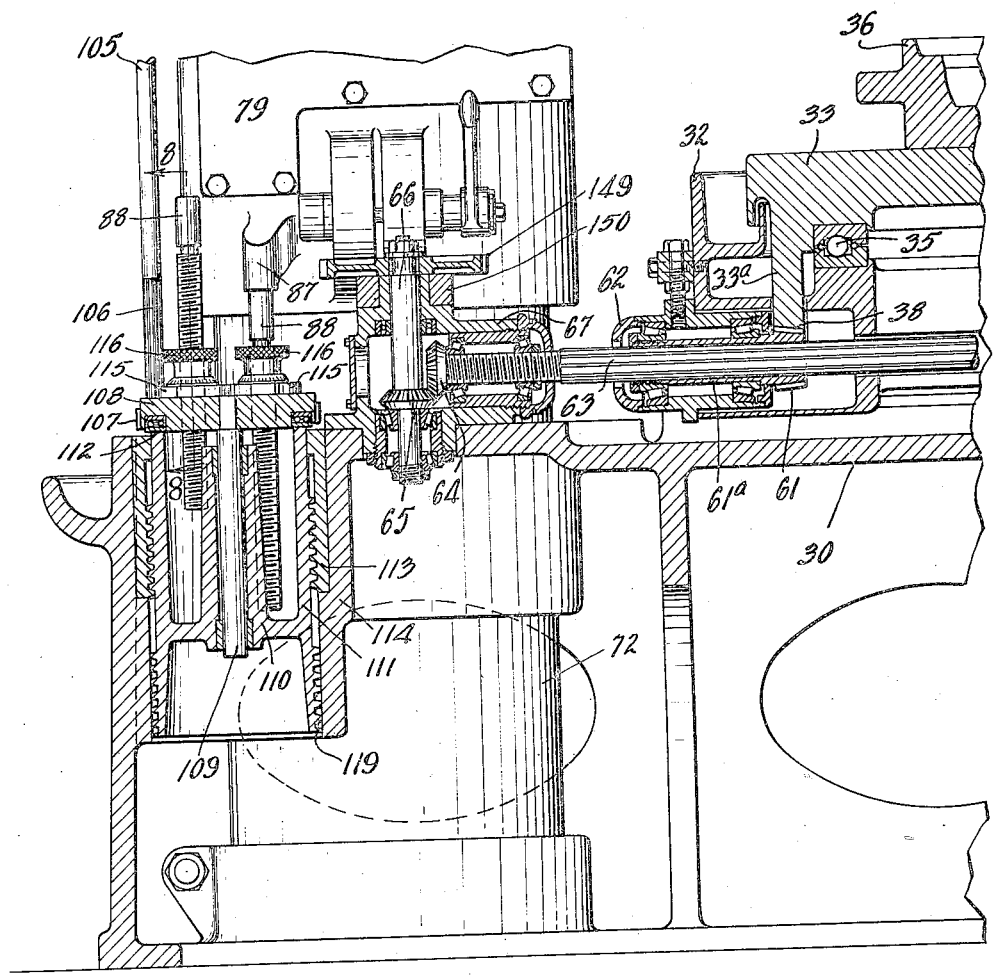
Figure 7 is a section on line 7—7 of Figure 5.
Figure 8:
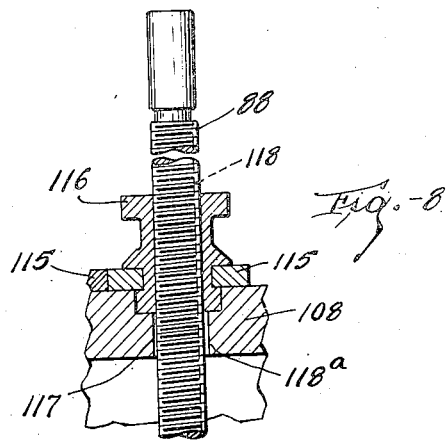
Figure 8 is a section on line 8—8 of Figure 7.

For positioning the proper stop pin 88 beneath the lug 87 automatically upon the positioning of its corresponding engraving unit in operative position, the ring gear 92 of the turret is meshed with a pinion 104 (Figure 3) on the upper end of a downwardly extending shaft 105 which is journaled in the head 79 and extends through a bushed aperture in the top of the base casting 30. The lower end portion of the shaft 105 is formed with elongated gear teeth 106 which mesh with gear teeth 107 formed on the periphery of a dial 108. As is most clearly shown in Figure 7, the dial 108 is mounted upon a vertical spindle 109 which is journaled in a bearing bracket 110 formed interiorly of a cylindrical sleeve 111, and a thrust bearing 112 is mounted between the upper end of said sleeve and the lower face of the dial 108. The sleeve and the lower face of the dial 113 which is secured in a suitable apertured boss 114 formed integral with the base casting 30 on the under side of its top wall. Secured to the upper face of the dial 108 are four uniformly spaced collars 115, 115 in which are swiveled respective thumb units 116, 116, and threaded through the latter are respective stop pins 88 which pass through respective apertures, such as the aperture 117, (Figure 8) in the dial. Each stop pin 88 is formed with a keyway 118 and riding therein is a key 118ª, (Figure 8) which is mounted in the wall of the dial 108 below the thumb-nut, the key preventing rotation of the stop-pin when the thumb-nut is turned to raise or lower the same.

Figure 12:
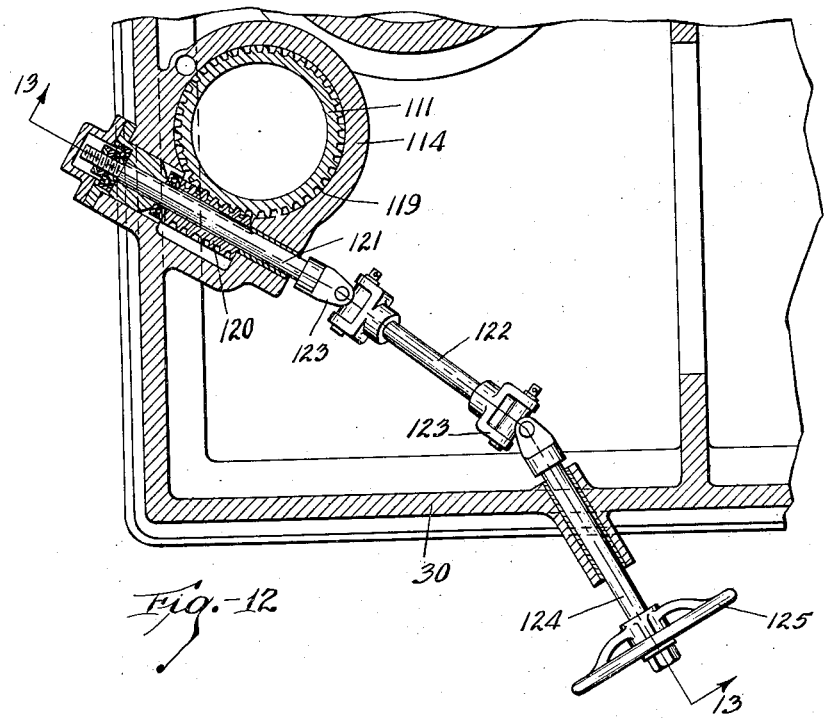
Figure 12 is a section on line 12—12 of Figure 3.
Figure 13:
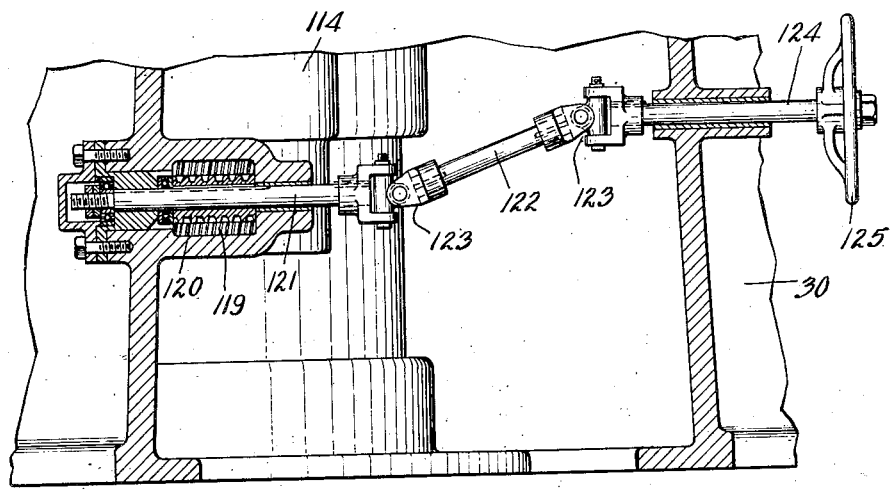
Figure 13 is a section on line 13—13 of Figure 12.

For raising or lowering the stop pins as a unit, upon occasion, as when a mold to be engraved is of different thickness than the preceding mold so that the turret requires to be positioned at a different elevation, the lower end of the sleeve 111 is formed with worm gear teeth 119 which are meshed with a worm 120 (Figures 12 and 13) mounted upon a shaft 121 that is journaled in suitable bearings mounted in the boss 114. The inner end of the shaft 121 is connected by an intermediate shaft 122 and universal joints 123, 123 to a shaft 124 which is disposed above and at an angle to the shaft 121 and projects obliquely through the front wall of the base casting 30, its end outside the casting being provided with a handwheel 125. Rotation of the latter effects rotation of the sleeve 111 and threads it inwardly or outwardly of the nut 113, the dial 108 moving axially with the sleeve, but being held stationary against rotative movement by the meshed gears 106, 107. The elongated gear teeth 106 on the shaft 105, and the slidable mounting of the latter in the base casting 30, permit the teeth 106, 107 always to be in mesh notwithstanding the up and down movement of the turret or the vertical adjustment of the stop pins as a unit.

The pattern or cam

As hereinbefore stated, a single pattern or cam controls the operation of the several engraving units, being so positioned as to be engaged by respective cam followers on the several engraving units, and being interconnected with the table 33 so as to be rotated concurrently therewith.

For so mounting the cam, a bracket 126 is mounted upon the front of the head 79, said bracket comprising a gear housing 127, and an arm 128 constituting a tail stock for a cam support. Journaled in the gear housing 127 is a short shaft 129, (Figure 6) formed on one end with a bevel gear 130, and having its other end pointed to fit within a complemental recess in one end of a cylindrical mandrel or cam support 131, the other end of the latter being axially engaged by a cone point set screw 132 threaded through the end portion of the arm 128. A tubular cam 133 is mounted upon the mandrel 131 and secured thereto by set screws 134, 134. As is most clearly shown in Figures 6 and 10, the face of the cam is formed with cam grooves 135, 135 at different positions longitudinally of the cam, said cam grooves being adapted to control the operation of the respective engraving units.

For driving the shaft 129, the gear 130 thereon is meshed with a bevel gear 136 formed on the upper end of a vertical shaft 137 which also is journaled in the housing 127 and extends downwardly therefrom and through a pair of gears 138 and 139, said gears being integrally formed, the latter in superposed relation to the former. The gears 138, 139 are formed with an elongated hub or quill 140, and the shaft 137 is splined at its lower end to effect driving connection therewith which permits the shaft to move axially in the quill. The quill 140 is journaled in suitable bearings in a sleeve 141 which is slidably mounted for vertical movement in a partly split bracket 142 on the base casting 30. On one side the sleeve 141 is formed with a longitudinally extending rack 143 and meshed therewith is a pinion 144 which is mounted upon a short shaft 145 that is journaled in the bracket 142 and provided exteriorly thereof with an operating handle 146 (Figure 3). A clamping bolt 147 is suitably mounted in the split portion of the bracket 142 for drawing the latter tightly about the sleeve 141 once the sleeve has been vertically adjusted.

The vertical adjustment of the sleeve 141 just described is for the purpose of positioning the gears 138 or 139 selectively at the proper elevation to mesh with other gearing associated with the mechanism for turning the table 33. As shown, the gear 138 is larger and has more teeth than the gear 139, so that when the gear 138 is in operative position the gear ratio between the turntable 33 and cam 133 is less than it is when the gear 139 is in operative position, or in other words, one revolution of the turntable produces fewer revolutions of the cam. However when either gear 138 or 139 is used the number of revolutions of the cam for one revolution of the turntable is a whole number. This is essential in order to effect uniform spacing of the characters circumferentially of the mold.

As shown, the gear 138 is in operative position, and it is meshed with an idler gear 148 which meshes with a gear 149 mounted upon the upper end of the shaft 66 outside the housing 67, said shaft 66 being manually rotated by means of the hand-wheel 70, as hereinbefore described, when the table 33 is being rotated. The gear 148 is journaled upon a quadrant 150 and is adjustably positioned radially thereof. The quadrant 150 is pivotally mounted upon the housing 67 coaxial with the shaft 66, and extends to the front of the machine, being provided thereat with an operating handle 151. The front end of the quadrant 150 is formed with an elongated concentric slot 152 through which projects a threaded stud 153, and a locking nut 154 having an operating handle is threaded onto said stud for locking the quadrant in the proper angular position, with the gears 138, 148 in mesh. The arrangement permits the convenient re-positioning of the gear 148 upon occasions when it is to be meshed with the gear 139.

Frequently it is necessary to adjust the angular position of the cam 133 to alter its relation to the angular position of the work. Such situations arise when it is necessary to retouch a previously engraved mold, or when a blank mold is mounted upon the table and requires to be determinately positioned with relation to the cam so that the characters in two mold halves will register properly when the mold is assembled. This invention includes simple mechanism for adjusting the angular position of the cam, and thus obviates the necessity of mounting the heavy work in determinate position upon the turntable 33.

For so adjusting the angular position of the cam 133, the end of the mandrel 131 adjacent the shaft 129 is formed with a worm gear 155 (see Figure 11) which is meshed with a worm 156 mounted upon a shaft 157 carried by a bracket 158. The latter is mounted upon the end portion of the shaft 129 and is formed with a suitable flange for enclosing said gear. The worm 156 is slightly tapered longitudinally, and is journaled in adjustable bearings 159, 159 so that the worm may be adjusted longitudinally to compensate for wear and to eliminate backlash. One end of the shaft 157 is provided with an adjusting handle 160, and the shaft has a locking nut 161 threaded onto its other end.

The engraving units

Figure 2:
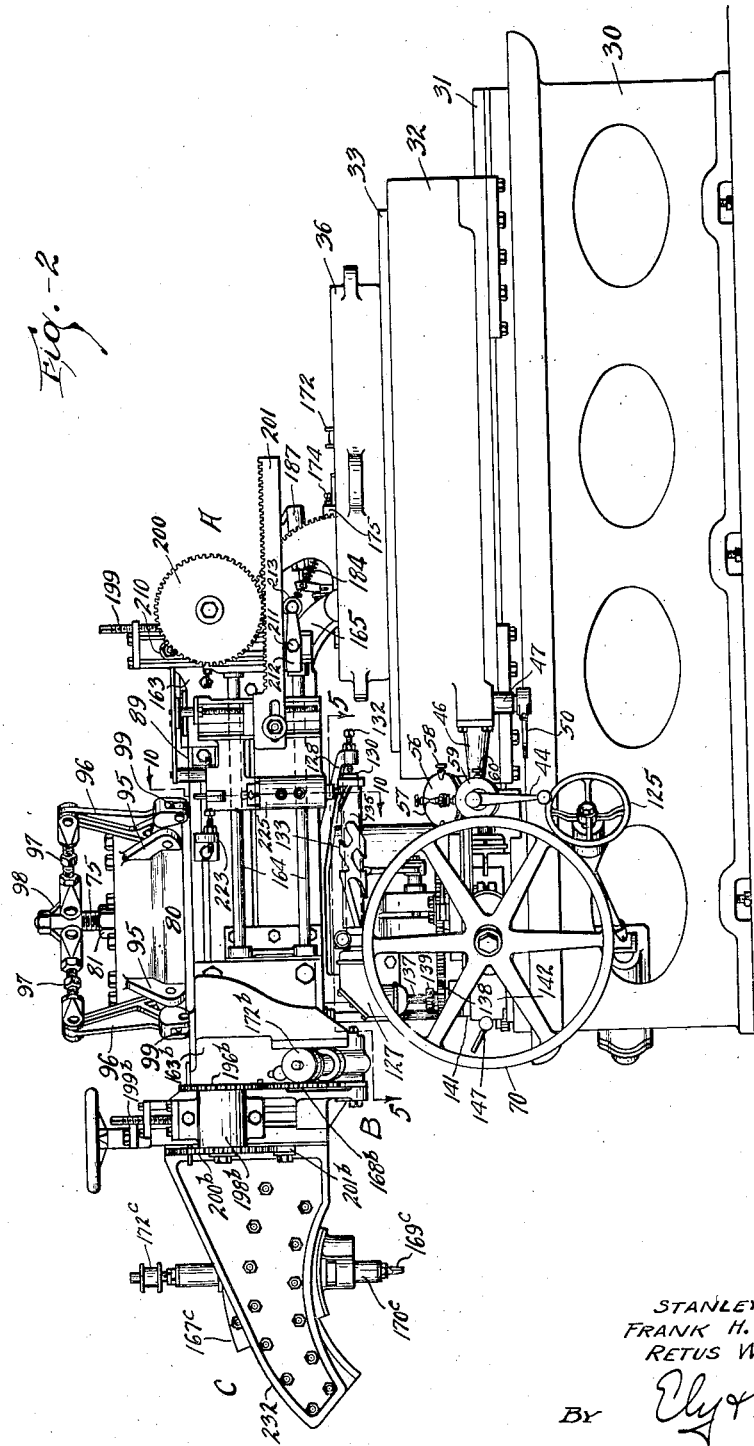
Figure 2 is a front elevation thereof.

As hereinbefore stated, the machine comprises four engraving units, namely A, B, C, and D, of which unit A is shown in operative position with relation to the work in the assembly Figures 1 and 2. The several engraving units, while differing in detail such as is necessary to enable them to perform their respective functions, are essentially alike so that a detail description of one unit will suffice for all, the primary differences between respective units being pointed out. The general concept of the engraving units is not new, but they do embody novel features which lighten labor and expedite the engraving of molds. Engraving unit A, which performs the initial engraving operation, will be described in detail, attention being directed particularly to Figure 14 constituting an enlarged elevation of this unit, in operative relation to the work.

Mounted upon the front of the turret 89 is a small bracket 162, (Figures 1, 2, 6 and 10), and mounted upon the adjacent side of the turret, facing the turntable 33, is a large bracket 163, and a pair of parallel, horizontal guide bars 164, 164 extend about half way across the front of the turret and are supported from their ends in said brackets 162, 163. The bottom of the bracket 163 is formed with a pair of arms, such as the arm 165, (Figure 14) in which is pivotally mounted at 166 a tool-supporting structure 167 which includes a gear sector 168 concentric with said pivot by means of which the tool support is moved angularly about the pivot.

The tool carried by the tool support 167 will best be understood by reference to Figure 18. The tool itself consists of a bit 169 which is threaded into one end of a spindle 170, and the latter is suitably journaled in a tubular sleeve 171 and has its opposite end provided with a pulley 172 by which it is driven by a transmission belt 173, (Figure 1) from a suitable source of power (not shown). The sleeve 171 is movable axially in the supporting structure 167 to feed the tool 169 into and out of the work, and an adjustable positioning stud 174 is threaded through a collar 175 mounted upon the sleeve 171 at the outer end thereof and abuts the adjacent supporting structure 167 for limiting the movement of the sleeve toward the work.

For moving the sleeve 171 axially in the structure 167, one side of said sleeve is formed with rack teeth 176 and meshed therewith is a gear sector 177 formed on one end of a lever 178 which is journaled on a pin 179 in a bracket 180 formed on the structure 167. The other end of the lever 178 is pivotally connected to one end of a pitman 181 which has its other end slidably mounted in a block 182 and provided with a stop collar 183 on its end beyond said block, there being a compression spring 184 mounted upon the pitman between the lever 178 and block 182. The block 182 is provided with a stem 182ª which constitutes a pivot pin connecting the free end of a lever 185 and the outer end of a piston rod 186 of a double acting fluid pressure cylinder 187, the latter being pivotally mounted at 188 upon the bracket 180. The cylinder 187 has its respective ends provided with fluid inlet and outlet pipes 189, 190.

The arrangement is such that when the forward end of the cylinder 187 is charged so as to retract the piston rod 186, the block 182 is moved along the pitman 181 so as to compress the spring 184 and thereby to effect such angular movement of the lever 178 as to cause it to feed the sleeve 171 toward the work, whereby the tool 167 is yieldingly fed into the work, the limit of such feeding movement being reached when the stud 174 abuts the supporting structure 167. The arrangement is such that excessive impact of the tool against the work is avoided. The operation described is reversed to withdraw the tool from the work, the lever 178 being turned angularly after the outwardly moving piston rod 186 has carried the block 182 into engagement with the collar 183 on the end of the pitman 181. A spring backed detent 191 is mounted in the bracket 180 and engages the pin 179 for lightly holding the latter in place therein, yet permitting the pin easily to be withdrawn, upon occasion, as when it is desired to remove the lever 178 to permit removal of the tool assembly as a unit from the tool support 167.

In order that the tool 169 will be rigidly supported while it is engaged with the work, means is provided for clamping the sleeve 171 securely in the bracket 167 in timed relation to the feeding of the sleeve toward the work. For this purpose a pair of clamping jaws 192, 192 (see Figure 19) are mounted in a suitable recess or slot 193 extending through the support 167, said jaws being arcuately formed to embrace the sleeve in a substantial circumferential area, and each jaw being formed with a laterally extending portion 192ª which engages an offset portion of the wall of the recess, thus providing fulcrums for the respective jaws. The jaws 192 are formed with respective flange portions 194 which extend through the slot 193 and are engaged exteriorly of the support 167 by respective right and left hand threads formed on a trunnion member 195. The lever 185 is clamped to the middle portion of the trunnion member 195, the arrangement being such that as the piston rod 186 is retracted to feed the sleeve 171 toward the work, the trunnion 195 is rotated by the lever 185 to draw the clamping jaws 192 about the sleeve, which they grip with sufficient tightness to prevent recession, the gripping action becoming effective after the tool 169 has attained its maximum penetration of the work, as defined by the position of the stud 174. The clamping jaws 192 release their grip upon the sleeve 171 immediately the movement of the piston rod 186 is reversed, so that the sleeve 171 is free to be retracted when the block 182 engages the collar 183 of the pitman as previously described.

Figure 14:
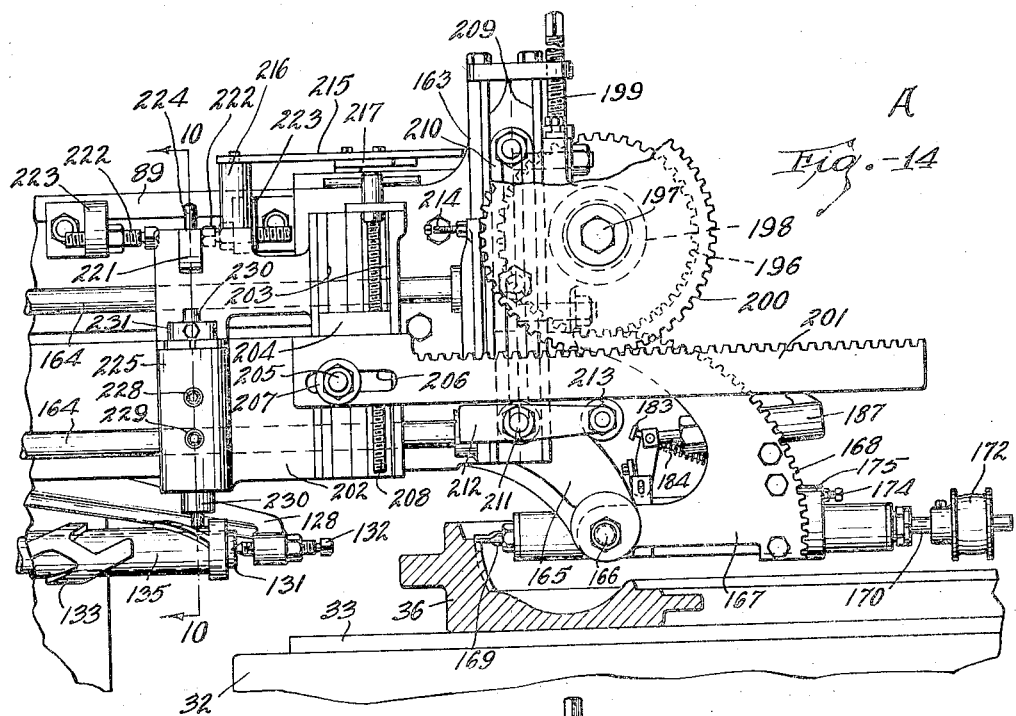
Figure 14 is a front elevation, on a larger scale, of an engraving unit designated "A" in Figure 1 of the drawings, the engraving unit being shown in operative relation to the work.

The tool 169 and associated mechanism just described normally is positioned substantially on a horizontal axis, as shown in Figure 14, and the tool support 167 is adapted to be turned angularly upon its pivot 166 for moving the tool 169 laterally, substantially up and down, as required for engraving the outer peripheral wall of the molding cavity of the mold 36. For so moving the tool support 167, the gear sector 168 thereof is meshed with a gear 196 mounted upon one end of a short shaft 197 that is journaled in a bearing bracket 198 slidably mounted for vertical movement upon the bracket 163, an adjustment screw 199 being provided for adjusting the elevation of the bracket 198 when different size gears 196 are used. Mounted upon the other end of the shaft 197 is a gear 200 meshed with a reciprocable horizontally disposed rack 201.

For reciprocating the rack 201, one end thereof is carried by a slide 202 mounted for horizontal movement upon the guide bars 164. To provide for adjusting the vertical position of the rack so that it may engage gears 200 of different diameters, the slide 202 is formed with a vertical way 203 in which is mounted a slide block 204 having a threaded stud 205 projecting therefrom which passes through a horizontal slot 206 in the end portion of the rack, a suitable nut 207 being threaded onto the stud 205 for holding the rack in place thereon. An adjusting screw 208 passing through the slide block 204 is provided for adjusting the position of the latter in the way 203. For holding the rack 201 securely in mesh with the gear 200, the bracket 163 is formed with a way 209 in which a slide 210 is adjustably mounted for vertical movement, and pivotally mounted at 211 on the lower end of said slide is an L-shaped lever 212. The free end of one arm of the lever 212 carries a roller 213 which bears against the bottom edge of the rack 201 and supports the latter, and the other arm of the lever 212 is provided with an adjusting stud 214 which bears against an adjacent portion of the bracket 163 and thus provides means for changing the angular position of the lever 212 upon its pivot 211 to raise or lower the rack supporting roller 213.

For moving the slide 202 along the guide bars 164, a link 215 is pivotally connected at one of its ends to a stud 216 rising from the top of the slide 202 and has its other end connected to an intermediate region of a lever 217 that is pivotally mounted at 218 upon the top of the bracket 163. A removable handle 219 is provided for mounting upon the levers 217 of the respective engraving units as the latter are moved to mold engraving position. Pivoted at 220 (see Figure 10) in a slot formed in the slide 202 is a plate 221 and a pair of adjustable stops 222, 222, which are mounted in respective brackets 223 secured upon the side of the turret 89, and are so positioned at each side of the plate 221 as to engage the latter at determinate positions and thus to limit the movement of the slide upon the bars 164. The plate 221 is provided with a handle or hand lever 224 by which it may be easily swung on its pivot to inoperative position, upon occasion, when it is desired not to limit the movement of the slide.

Mounted upon the slide 202, preferably integral therewith, is a vertically disposed double acting, fluid pressure operated cylinder 225, having the usual piston 226, piston rod 227, and respective fluid inlet and outlet pipes 228, 229 having communication with its chamber above and below the piston 226, as is most clearly shown in Figure 10. The piston rod 227 is tubular in form, and slidably mounted interiorly thereof is a cam follower 230, the lower end of which extends below the cylinder 225 and is adapted to engage in one of the recesses 135 in the cam 133. An adjustable collar 231 is mounted upon the upper end of the cam follower 230 to position it axially within the piston rod 227.

The pipes 228, 229 of the cylinder 225 and the pipes 189, 190 of the cylinder 187 extend to a common valve (not shown) which is located upon the turret 89 in convenient position to be manually operated by the operator of the machine. The valve is arranged so as concurrently to deliver pressure fluid to the upper end of the cylinder 225 and the forward end of the cylinder 187.

Figure 15:
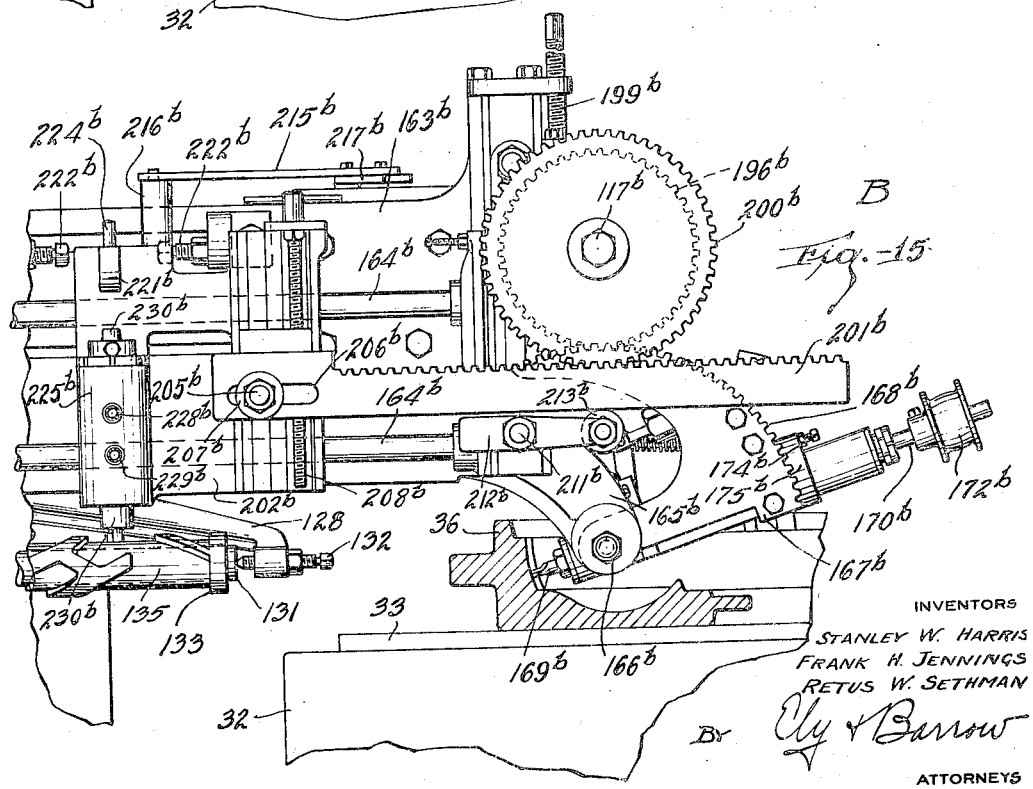
Figure 15 is a view similar to Figure 14 of the engraving unit designated "B" in Figure 1.

As hereinbefore stated, the several engraving units A, B, C, and D are essentially of the same construction, and in the drawings the identical parts bear the same reference characters, with the addition of respective exponents "b", "c", or "d" according to the unit of which they are a part. Engraving unit "B", Figure 15, is identical with unit "A" except that the tool 169$^b$ and pivot 166$^b$ are closer together than the same elements of unit A, with the result that a cut of shorter radius is made in the mold.

Engraving unit "C", Figure 16, is adapted to make a convex cut in the mold, the axis of the cut lying within the work so that the pivotal arrangement of the engraving tools of units A and B is not adapted for use with this unit. Accordingly, the tool support 167$^c$ is mounted for sliding movement along an arcuate bracket 232, the tool 169$^c$ being disposed radially of said bracket, adjacent the axis thereof. The bracket 232 is mounted for vertical movement upon the bracket 163$^c$, and a handwheel 233 on the end of an adjusting screw (not shown) is provided for raising and lowering the bracket 232.

Engraving unit "D" is adapted to make a straight cut in the mold 36, as is most clearly shown in Figure 17. The engraving tool assembly is mounted upon a tool support 234 which rides upon a pair of parallel slide bars 235, 235, the latter having their respective inner ends mounted in a bracket 236 which is swiveled about the axis of the shaft 197$^d$. The shaft 197$^d$ and bracket 236 are carried by a bracket 237 which is mounted for vertical movement upon the bracket 163$^d$, and a hand-wheel 238 on the end of an adjusting screw (not shown) is provided for raising and lowering the bracket 237 and mechanism carried thereby. The outer ends of the slide bars 235 are connected by a yoke 239, and a bearing member 240 is swiveled at one corner thereof and carries a threaded shaft 241 which is threaded into a nut 242 swiveled on the bracket 237, the arrangement providing means for adjusting the angular position of the slide bars 235 with relation to the bracket 237. A locking bolt 243 passing through the bracket 236 and through an arcuate slot 244 in the bracket 237 is provided for securely holding the brackets 236, 237 in adjusted angular position. The tool support 234 is moved longitudinally of the slide bars 235 by means of a rack 245 which is secured to the tool support and meshed with the gear 196$^d$ on the shaft 197$^d$.

Operation

In the operation of the machine, a tire mold 36 is mounted concentrically upon the turntable 33, and secured thereto by the clamps 37 while the head 79 is in elevated position and the turret 89 lifted off the head to disengage the registering members 100, 103, as is clearly shown in Figure 3. Then the turret is manually turned to bring engraving unit "A" to engraving position over the mold, the dog 83 is disengaged from the rack 82, and the flow of pressure fluid to the cylinder 72 is reversed to start the piston 74 and piston rod 75 downward. The head 79 is thus lowered, and comes to rest upon the stop pin 88 which is positioned beneath the lug 87, at the proper elevation for engraving the mold. Continued downward movement of the piston rod 75 causes the levers 96 to swing on their pivots, and thus to force the turret 89 downwardly against the pressure of the springs 90 until it rests upon the head 79, the lugs 101 of the ring 100 entering the recesses 102 of the ring 103 to provide accurate angular positioning of the turret. If the mold 36 requires to be registered with the cam 133 it may be done at this time, requiring only the turning of the member 160. The driving belt 173 is now mounted upon the pulley 172 to rotate the tool 169, and the valve controlling the fluid pressure cylinders 187, 225 is manually operated to project the cam follower 230 into a cam groove 135 of the cam 133, and to yieldingly feed the tool sleeve 171 toward the work until the tool 169 penetrates a determinate distance thereinto. The engraving of the mold then proceeds in the usual manner, with the operator rotating the cam and mold in timed relation by turning the hand-wheel 70 with one hand, while with the other hand he manipulates the cam follower back and forth in the cam groove 135 by means of the handle 219 mounted upon the lever 217.

As soon as a complete circumferential series of characters are engraved in the mold 36, the operations described are reversed to withdraw the tool 169 from the work, withdraw the cam follower 230 from the cam, and again to raise the turret 89 to the position shown in Figure 3. The turret is then manually turned to bring engraving unit "B" or either of the other engraving units into mold engraving position, and the hand crank 44 turned to move the saddle 32 backward or forward to proper position for the engraving of another series of characters in the mold, the accurate positioning of the saddle being facilitated by use of the dials 56, 59 and the respective riders 58, 60 thereon as hereinbefore described.

The operations described for engraving the first series of characters in the mold are then repeated for engraving the second series of characters, and subsequently are repeated for engraving the third and fourth series of characters.

The invention embodies means for completely engraving a tire mold, and for attaining the other advantages set forth in the foregoing statement of objects. The machine is practically universal in its ability to engrave molds of various sizes and designs, and adjustments to the machine for accommodating the various molds are easily and quickly effected.

The machine may be variously modified within the scope of the appended claims which are not limited wholly to the specific construction shown and described.

What is claimed is:

1. In a machine for engraving molds, the combination of a rotatable turret, a plurality of mold engraving units mounted thereon and adapted to be selectively positioned over a mold, a single cam adapted to control the course of the respective engraving tools and operatively engaged solely with the engraving unit selectively positioned over the mold, and means for concurrently raising and lowering the turret and the cam to change the elevation of the respective engraving units with relation to the mold.

2. In a machine for engraving molds, the combination of a head, a rotatable turret mounted thereon, a plurality of mold engraving units mounted on said turret and adapted to be selectively positioned over a mold by the rotation of the turret, a single cam mounted upon said head and operatively engaged solely by the engraving unit in mold engraving position, the turret being movable relatively of the cam, and means for raising and lowering said head to alter the elevation of the engraving units and cam with relation to the mold.

3. In a machine for engraving molds, the combination of a head, a rotatable turret mounted thereon, a plurality of mold engraving units mounted upon said turret and selectively positionable over a mold by rotation of the turret, means for raising and lowering the head, a plurality of stop pins of different heights positionable beneath the head to define its lowermost position, means associated with the turret for positioning respective stop pins beneath the head in determinate relation to the positions of the respective mold engraving units, and means for raising and lowering all the stop pins as a unit.

4. In a mold engraving machine, the combination of a rotatable mold support, an engraving unit, a cam controlling the operation of said engraving unit, means for rotating said cam and said mold support at determinate relative angular speeds, and a connection between the cam and its rotating means permitting changing of the angular position of the cam with relation to the cam rotating means while the cam is engaged with the latter.

5. In a mold engraving machine, the combination of a rotatable mold support, an engraving unit, a mandrel, a cam mounted thereon for controlling the operation of said engraving unit, drive means common to the mandrel and mold support for rotating them at relative angular speeds, and a worm and gear connection between the mandrel and its drive means for altering the angular position of the cam with relation to the mold support.

6. In a mold engraving machine, the combination of a rotatable mold support, a mold engraving unit positioned thereover, a cam controlling the operation of the mold engraving unit, means for raising and lowering the cam and mold engraving unit with relation to the mold support, and drive means common to the cam and mold support for rotating them at relative angular speeds, said drive means being operatively connected to the cam at all positions of latter.

7. In a mold engraving machine, the combination of a head, a turret rotatably mounted thereon, a plurality of mold engraving units mounted upon said turret adapted to be selectively positioned over the work, means for raising and lowering the head with relation to the work, and means for raising and lowering the turret with relation to the head.

8. A combination as defined in claim 7 in which the raising and lowering of the turret is effected in timed relation to the raising and lowering of the head.

9. In a mold engraving machine, the combination of a support, a turret rotatably mounted thereon, a plurality of mold engraving units mounted upon said turret adapted to be selectively positioned over the work, yielding means normally urging said turret upwardly on said support, and power operated means for forcing the turret downwardly against said yielding means.

10. A combination as defined in claim 9 including registering means for accurately positioning the mold units in mold engraving position, said registering means being engaged when the turret is in its lowered position and disengaged when the turret is in raised position.

11. In a mold engraving machine, the combination of a head, a turret mounted thereon and movable axially and angularly thereof, a plurality of mold engraving units mounted upon said turret adapted to be selectively positioned over the work, a fluid pressure cylinder having its piston rod connected to the head for raising and lowering the same, and means associated with said piston rod for effecting axial movement of the turret on the head.

12. A combination as defined in claim 11 including a lost motion connection between the piston rod and the head for causing the vertical movement of the head and the axial movement of the turret relative thereto to occur in sequence.

13. In a machine of the character described, the combination of a fluid pressure cylinder having a piston rod, a head mounted for vertical movement upon the cylinder and connected to said piston rod, a turret mounted upon said head and axially and angularly movable relatively thereto, yielding means between the head and turret normally urging them apart, and lever means connected to the piston rod for forcing the turret toward the head against said yielding means.

14. A combination as defined in claim 13 including a lost motion connection between the piston rod and head whereby the movements of the head and the axial movement of the turret relative to the head occur in timed sequence.

15. In a machine of the character described, the combination, with an engraving device, of yielding means for feeding the engraving tool into the work, clamping means for rigidly supporting the tool after it has penetrated the work, and power operating means common to the tool feeding means and clamping means.

16. In a machine of the character described, the combination with an engraving machine, of a lever for moving the engraving tool axially to feed it into and out of engagement with the work, yielding means engaging said lever to urge it in a direction to feed the tool into the work, non-yielding means connected to said lever for positively withdrawing the tool from the work, a clamp for holding the tool in fixed axial position in engagement with the work, and a power device for operating said yielding means, non-yielding means, and clamp in timed sequence.

17. In a machine of the character described, the combination of an engraving device including a cam, a fluid pressure cylinder mounted upon said engraving device, and a cam follower associated with said cylinder and adapted to be moved thereby into and out of operative association with the cam.

18. A combination as defined in claim 17 in which the cam follower is slidably mounted within the piston rod of the fluid pressure cylinder.

19. In a machine for engraving molds, the combination of a plurality of mold engraving units, respective retractible cam followers thereon, a single cam for controlling the course of the engraving tools of the several engraving units and engaged solely by the cam follower of the engraving unit in mold engraving position, and means for moving the engraving units relatively of the mold and cam to position a unit selectively in mold engraving position and in position for its cam follower to engage a determinate part of the cam.

20. A combination as defined in claim 15 including means for progressively applying the clamping means whereby it does not become effective until after the tool has penetrated the work.

21. In a machine of the character described, the combination of a plurality of mold engraving units, a single cam for controlling the course of the engraving tools of the several engraving units, means for moving the engraving units relatively of the mold and cam for positioning the units selectively in mold engraving position, and respective cam followers associated with the several engraving units, the cam cooperating with the cam follower of the engraving unit in mold-engraving position.

22. A combination as defined in claim 21 including means for reciprocating the respective cam followers so that they engage and disengage from the cam.

23. In a machine of the character described, the combination, with an engraving machine, of a lever for moving the engraving tool axially to feed it into and out of engagement with the work, yielding means engaging said lever to urge it in a direction to feed the tool into the work, non-yielding means connected to said lever for positively withdrawing the tool from the work, and power operating means common to the yielding means and non-yielding means for causing them to operate said lever.

STANLEY W. HARRIS.
FRANK H. JENNINGS.
RETUS W. SETHMAN.